(12) United States Patent
Summers et al.

(10) Patent No.: US 9,299,097 B2
(45) Date of Patent: Mar. 29, 2016

(54) INFORMATION ELEMENT

(71) Applicant: Jaguar Land Rover Limited, Whitley, Coventry Warwickshire (GB)

(72) Inventors: Nathan Summers, Whitley (GB); Alan Wilkinson, Whitley (GB); John Davies, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/430,900

(22) PCT Filed: Sep. 25, 2013

(86) PCT No.: PCT/EP2013/070003
§ 371 (c)(1),
(2) Date: Mar. 24, 2015

(87) PCT Pub. No.: WO2014/049012
PCT Pub. Date: Apr. 3, 2014

(65) Prior Publication Data
US 2015/0242925 A1    Aug. 27, 2015

(30) Foreign Application Priority Data
Sep. 25, 2012    (GB) .................................. 1217105.4

(51) Int. Cl.
*G06Q 30/06* (2012.01)
*H04W 4/20* (2009.01)
*G06F 17/30* (2006.01)
*G06Q 30/02* (2012.01)

(52) U.S. Cl.
CPC ...... *G06Q 30/0623* (2013.01); *G06F 17/30879* (2013.01); *H04W 4/20* (2013.01); *G06Q 30/0281* (2013.01); *G06Q 30/0621* (2013.01)

(58) Field of Classification Search
CPC .......... G06Q 30/0623; G06Q 30/0281; G06Q 30/0621; H04W 4/20; G06F 17/30879
See application file for complete search history.

(56) References Cited

U.S. PATENT DOCUMENTS 6,779,727 B2 * 8/2004 Warther ................. G07C 13/00
                                                          235/286
7,028,902 B2 * 4/2006 Xu ........................... G06K 7/14
                                                          235/462.01

FOREIGN PATENT DOCUMENTS

| CN | 201191415 Y | 2/2009 |
| EP | 1811431 A1 | 7/2007 |
| EP | 2420923 A2 | 2/2012 |
| WO | 2005001628 A2 | 1/2005 |
| WO | 2008135764 A1 | 11/2008 |

OTHER PUBLICATIONS

GB Combined Search and Examination Report for corresponding application No. 1217105.4, dated Jan. 25, 2013, 7 pages.
International Search Report for application No. PCT/EP2013/070003, dated Jan. 2, 2014, 3 pages.
Written Opinion for application No. PCT/EP2013/070003, dated Jan. 2, 2014, 6 pages.

* cited by examiner

*Primary Examiner* — Kristy A Haupt
(74) *Attorney, Agent, or Firm* — Reising Ethington P.C.

(57) ABSTRACT

A method of using an information element to access functionality on a computing device, the method comprising: scanning the information element to retrieve data related to the information element; manipulating a scannable aspect of the information element; re-scanning the information element; wherein manipulation of the scannable aspect of the information element triggers different functionality in the computing device when the information element is re-scanned.

20 Claims, 11 Drawing Sheets

INFORMATION ELEMENT

TECHNICAL FIELD

The present invention relates to an information element. The present invention relates particularly, but not exclusively, to a method of using an information element, such as a barcode or QR code. Aspects of the invention relate to a system and computing device for carrying out the method of using the information element.

BACKGROUND

Prospective customers wishing to purchase a transaction item generally have one or more purchase routes available to them: purchase in a store, telephone order or online purchase via an online transaction platform (e.g. manufacturer's website). With the proliferation of high speed broadband internet connections many customers are favouring the online purchase route.

In some circumstances, particularly for large value purchases, a customer may initially research a transaction. Item online before visiting a retail outlet to either complete the transaction or to view the transaction item prior to an online purchase.

In some transaction environments the transaction item may comprise configurable elements and the online transaction platform that is available for the customer to use may allow these various configurable options to be displayed to the customer. For example, where the transaction item is a vehicle then the customer may have the option of exploring various configuration options relating to the vehicle they are interested in, e.g. paint colour and finish, interior trim options, exterior trim options etc. Any changes made while viewing the vehicle on the manufacturer's website may be represented via an online rendering of the vehicle that has been selected.

QR Codes are a type of matrix barcode (or two-dimensional code) comprising an arrangement of modules on a background. QR codes are often square in shape. Although black modules on a white background are most common any contrasting module/background colour scheme may be used. QR codes may be used to encode a variety of information. Although initially developed in the automotive industry the use of such codes has become more commonplace in advertising and packaging. Additionally, the rise in popularity of so called smartphones (such as the iPhone® and Android® based phones) and other smart devices such as tablet computer devices (such as the iPad®) and PDAs has meant that QR codes may be more easily used by consumers since such smartphones/devices generally incorporate camera devices and support the installation of OR software reader applications.

QR codes and other types of information element (such as barcodes and glyphs) either encode static data or are linked via a URL to online content.

It is an aim of the present invention to address disadvantages associated with the use of information elements, such as QR codes.

SUMMARY OF THE INVENTION

According to an aspect of the present invention, there is provided a method of using an information element to access functionality on a computing device, the method comprising: scanning the information element to retrieve data related to the information element; manipulating a scannable aspect of the information element; and re-scanning the information element; wherein manipulation of the scannable aspect of the information element triggers different functionality in the computing device when the information element is re-scanned.

Embodiments of the present invention provide a method of triggering or accessing functionality on a computing device by the manipulation of an information element (and in particular a scannable aspect of the information element). The information element is presented for scanning, is manipulated in some manner and is then re-scanned. The different functionality available may then be accessed by the type of manipulation made to the information element. The scannable aspect of the information element may refer to the orientation of the information element relative to a scanner device or whether the information element is fully or partially visible to the scanner device.

It is noted that manipulating the scannable aspect of the information element provides a mechanism for triggering different functionality in the computing device without the need for either generating or presenting additional information elements.

For example, manipulating the scannable aspect of the information element may comprise obscuring a part of the information element such that there is a visible proportion and an obscured proportion of the information element. In this case different functionality may then be triggered in the computing device when the information element is re-scanned by virtue of the particular part of the information element that has been obscured.

In an alliterative, manipulating the scannable aspect of the information element may comprise rotating the information element relative to a scanning device and varying the orientation of the information element relative to the scanning device triggers different functionality in the computing device when the information element is re-scanned.

The information element may be scanned with an information capture device. The information element may be in the form of optical content, such as any one of: a barcode; a glyph; a dynamic optical encoding of content.

The act of scanning and/or re-scanning the information element may comprise displaying the information element on a display device. The display device may be a mobile computing device (such as a smartphone or tablet computer).

Manipulation of the scannable aspect of the information element for re-scanning may be controlled by the display device, a display screen representation of the information element being altered in order to manipulate the information element. Where manipulation of the scannable aspect of the information element comprises obscuring a part of the information element in order to trigger different functionality then the proportion of the information element visible for scanning may be controlled by the display device, a display screen representation of the information element being altered in order to vary the part of the information element that is obscured. The display device may be configured to receive user commands to vary the part of the information element that is obscured.

Scanning the information element may retrieve data comprising user identification data. The user may, for example, have interacted with a computer system that generated the information element and may have entered user identification data as part of a log-in or registration process. Linking the information element to user identification data may therefore allow stored user specific data to be retrieved.

Scanning the information element may retrieve function relationship data relating information element configurations to computing device functions. In this manner various information element manipulations may be associated with predetermined functions that are to be triggered in the event that that particular manipulation of the information element is presented for re-scanning.

The function relationship data may be user-specific. In this manner different users (who have information elements that are unique to them) may trigger different functionality in the computing device even though they make the same manipulation to their information element (For example, each user might rotate their information element through 90 degrees clockwise. In one instance this might open a list of menu options and in the other case this might change the orientation of an object displayed on a display device).

The functionality in the computing device that is triggered by re-scanning the information element may comprise one or more of the following: changing the colour of a simulated object that is displayed on a display device in communication with the computing device; animating an object that is displayed on a display device in communication with the computing device; changing the view of an object that is displayed on a display device in communication with the computing device.

Scanning the information element may retrieve data related to an object to be simulated. Scanning the information element starts a simulation of an object. The object that is displayed may be a transaction item that has been configured by a user. Data related to the information element is retrieved from a further computing device.

According to another aspect of the invention there is provided a system comprising: a computing device; scanning means for scanning an information element wherein the system is arranged to: scan the information element using the scanning means to retrieve data related to the information element; re-scan the information element using the scanning means and compare the re-scanned information element to the scanned information element and to determine if the information element has been manipulated wherein the computing device is further arranged to perform different functionality depending on the type of manipulation of the information element.

According to a further aspect of the invention there is provided a computing device comprising: inputs arranged to receive data from a scanning means; processing means arranged to interpret the data received by the inputs and to perform a different function in dependence on the received data wherein the computing device is arranged to: receive data relating to a scan of the information element and to retrieve data related to the information element; receive data relating to a re-scan of the information element and compare the re-scanned information element to the scanned information element and to determine if the information element has been manipulated, the processing means being arranged to perform different functionality depending on the type of manipulation of the information element that has occurred.

According to a yet further aspect of the invention, there is provided a method of using an information element to access functionality on a computing device, the method comprising: scanning the information element to retrieve data related to the information element; manipulating the information element; and re-scanning the information element; wherein manipulation of the information element triggers different functionality in the computing device when the information element is re-scanned.

The invention extends to a carrier medium for carrying a computer readable code for controlling a server to carry out the method of the first aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

In the following description embodiments of the present invention relating to the method of using an information element are described in the context of a transaction for a transaction item (e.g. the purchase of a vehicle).

Figure 1:
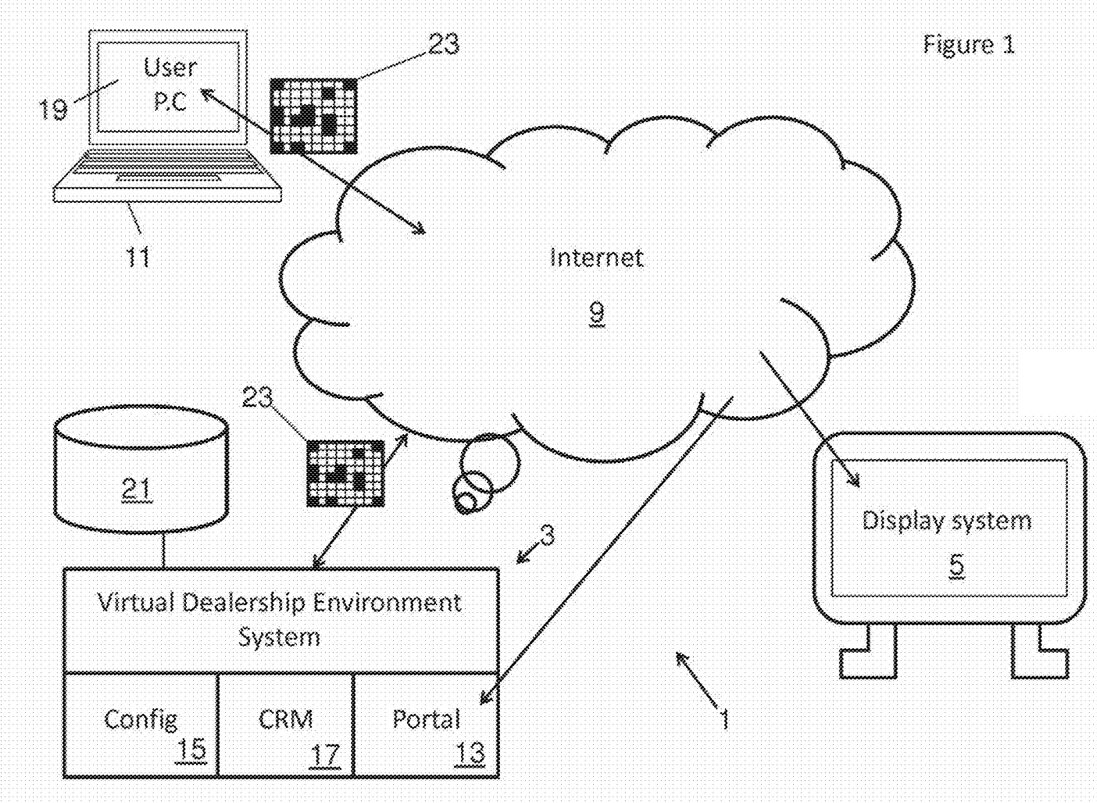
FIG. 1 shows an overview of the architecture of a transaction management system.
Figure 2:
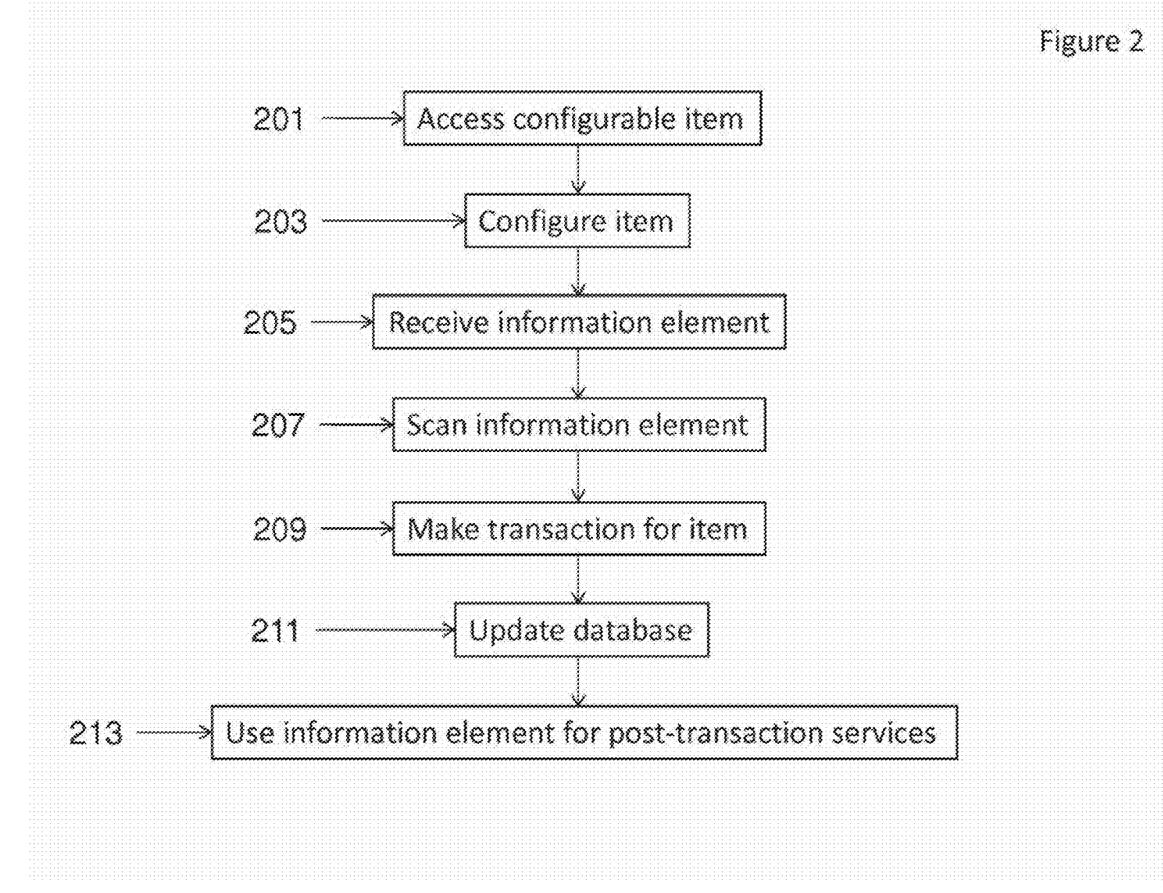
FIG. 2 is a flow chart of the lifecycle of a transaction in accordance with the transaction management system of FIG. 1.
Figure 3:
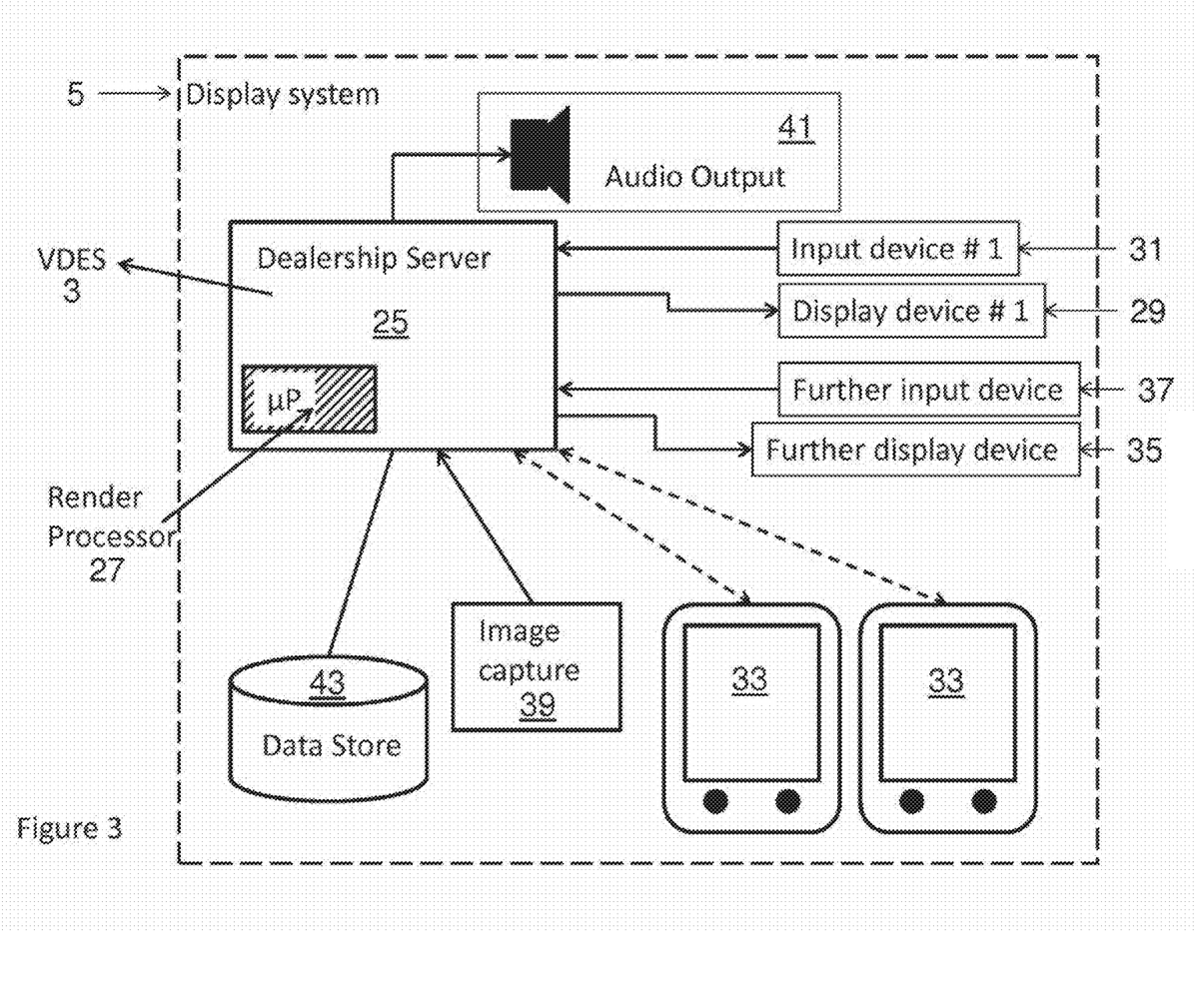
FIG. 3 shows the elements of a system component of FIG. 1 in greater detail.

FIGS. 1 to 3 and their associated description relate to an architecture of a transaction management system and a method of using such a system. These figures and their associated description are given to provide a context for describing embodiments of the present invention.

FIGS. 4 to 12 describe an information element and the use of such an element in accordance with embodiments of the present invention. For the sake of clarity the use of such an information element is described from the viewpoint of the purchase of a vehicle but it is to be appreciated that the described embodiments of the present invention may be used in any environment in which an information element is generated such at user(s) may interact with it.

FIG. 1 shows a transaction management system 1. The transaction management system 1 comprises a transaction server 3 and a display system 5.

As shown in FIG. 1, the server 3 and display system 5 are located remotely from one another and are in communication with one another via the internet 9 (or any another suitable communications network, e.g. a bespoke communications network or a mobile communications based network). It is however noted that the server 3 and display system 5 could be co-located at the same physical location.

As well as being in communication with the display system 5, the server 3 may also be accessed by users at a user computing device 11 (such as a PC, smartphone, laptop or any other suitable computing device). For the sake of clarity only one user computing device is shown in FIG. 1 although it is to be appreciated that a plurality of such computing devices may interact with the server 3 at any given time.

The server further comprises a portal means 13 in the form of a portal module through which a user at the computing device 11 may interact with the server 3 (and through which the server 3 may interact with the display system 5), configuration means 15 in the form of a configuration module and customer relationship management (CRM) means 17 in the form of a customer relationship management module.

In use, the server may be arranged to output data (via the portal means 13) to the computing device 11 to allow a visual representation of a transaction item to be displayed on a display screen 19 of the computing device. The user may configure the transaction item to display various different configuration options and the configuration means 15 is arranged to manage the configuration process.

Any user related data entered during the user's interaction with the server 3 may be recorded and captured within the CRM means 17 and stored within a database 21. Database 21 may also store details of the various transaction items that the user can access along with each items potential configuration settings/options.

Also, shown in FIG. 1 is an information element 23 in accordance with embodiments or the present invention, the operation of which is described in detail below. The information element is shown being supplied to the user's computing device 11. It is also noted that the information element 23 and/or the visual representation of the transaction item may also be sent to the display system 5 as described in greater detail below.

The transaction management system 1 may be used to manage the lifecycle of a transaction made by a user. The lifecycle management process is depicted in FIG. 2 which is described with further reference to FIG. 1.

In Step 201 a user at a computing device 11 connects to the transaction management system 1 and in particular the server 3 via the portal means 13 and the internet 9 and accesses a configurable transaction item. The transaction item may be a vehicle and the accessing of a configurable transaction item may comprise choosing a vehicle model.

In Step 203 the user interacts with the configuration means 15 to configure the transaction item. The configuration options may relate to configurable elements on the selected vehicle, e.g. paint colour and finish, interior and exterior trim options etc. As different configuration options are selected the server 3 may output an updated representation of the transaction item for display on the display screen 19 of the computing device 11.

Once the user has configured the transaction item the server 3 stores the configured transaction item, e.g. in the database 21, to allow later retrieval and generates an information element 23 in step 205 that is linked to the configured transaction item data. The information element 23 may be in the form of an optical representation, examples of which may be a barcode, such as a two-dimensional barcode. QR code, glyph or a dynamic optical encoding of content. The CRM means 17 may be arranged to generate the information element and to manage the link between the information element 23, configured transaction item and user details. The data associated with the configured transaction item that is stored in the database 21 comprises the transaction item selected by the user and the user selected configuration options relating to that transaction item. The information element 23 may be sent to the user.

Once the configured transaction item has been linked to the information element the user is able to retrieve the configuration settings (the selected user configuration options) for the transaction element at a later point in time, in step 207, by scanning the information element. For example, where the information element comprises an optical information element, the action of scanning may comprise placing the information element in the field of view of a camera or scanning with a barcode reader. In one example the information element may be displayed on a computing device (e.g. a smart device such as an iPhone®, Android® phone or tablet device). Such a computing device may additionally comprise a near-field communication device or a Bluetooth® iBeacon device or equivalent as well as means for displaying the information element. In such an example the information element may be scanned in the manner described above and the NFC/iBeacon or equivalent device may be scanned or queried either to transfer more information related to the user or to support a user identity verification method.

Having scanned the information element 23 the configuration settings for the transaction item may be retrieved at a point of sale system from the database 21/CRM means 17 on the server 3 and the user may make a transaction to acquire the transaction item (step 209). In more detail, the data from the scanned information element 23 is received at the portal means 13 and passed to the CRM means 17 which can retrieve the selected configuration options for the transaction element 23 from the database 21.

Although not shown in FIG. 2 it is noted that a security check/validation step may be incorporated within the process flow of FIG. 2 (for example within either step 209 or 211) in which a user identification process is triggered and possibly a credit check. For example, a user may be required to scan an identification item (such as a driving license) as part of the scanning step 207 in order to retrieve their configuration options. A credit check step may also be initiated, especially for high value transaction items, in which a user's ability to acquire the transaction item is made. This may be an automated credit check or may involve interaction with a human operator (who may be remotely located at, for example, a call centre). As well as determining the users ability to acquire the transaction item such a credit check may also prevent a user from inadvertently acquiring a transaction item by accidentally selecting a purchase option.

In Step 211 the database 21 is updated (via the CRM means 17) with details of the transaction. For the user in question the database now stores details of a unique information element for that user, and the transaction item such as the vehicle model and configuration settings for that vehicle and details of the transaction.

In Step 213 the information element may be used to access post-transaction services. For the vehicle transaction example this may comprise scanning the information element again to receive details of the progress of the vehicle build or to access servicing or maintenance options (e.g. the transaction element could be scanned and the user presented with the option of booking a regular service).

FIG. 3 shows a system component of the transaction management system 1 of FIG. 1 in more detail. In particular, FIG. 3 shows the display system 5 of FIG. 1 in greater detail. It can be seen that the display system comprises a display server 25 which includes a means for rendering 27 in the form of a render processor. The display server is also in communication with a first display device 29, a first input device 31, second display devices 33 (which are represented in the figure by a portable tablet computing device such as an iPad® but which may be any suitable computing device such as a laptop, PC etc.) and a further display device 35 and further input device 37.

The display system 5 also includes an image capture device 39, such as a camera or barcode scanner, an audio output device 41, such as a loudspeaker or arrangement of speakers, and a data store 43.

The display system 5 shown in FIGS. 1 and 3 is in communication with the server 3 and may receive from the server 3 data relating to the transaction item that the user has configured according to the process of FIG. 2 above. Such data may comprise information to allow the render processor 27 to render a simulation/representation of the transaction item for display on the first display device 29 and/or the second display devices 33.

It is noted that the simulation of the transaction item that is displayed on the first display device 29 may be manipulated via the first input device 31. Suitable input devices include touchpads (which may be embedded within the display screen of the first display device or which may be a standalone input device in communication with the render processor 27), gesture recognition input devices (such as the Microsoft Kinect® system), speech recognition input devices, keyboard and mouse input devices etc.

It is also noted that the second display devices 33 may also allow manipulation or the representation of the transaction item that is displayed, e.g. in the case of a tablet computing device the input may be received via a touchscreen.

The display system 5 may represent an actual or a "virtual" car dealership where the user can view and interact with a near life-size rendering of the transaction item that they have configured.

The display system 5 may be located in the same physical location that the transaction item would normally be purchased from (e.g. it may be located in a car showroom, an actual car dealership) or alternatively it may be located in another environment (e.g. shopping mall, airport departure lounge etc., a "virtual" car dealership).

The display system 5 affords the user the opportunity to see a rendering, prior to purchase, of their selected and configured transaction item on a display device with superior display functionality than the computing device 11 that they started the transaction lifecycle upon. The first display device 29 may comprise a high definition screen of sufficient dimensions to be able to display the transaction item on substantially life-size scale.

As noted above the transaction item may be configured by the user from the computing device 11 and data relating to the configured transaction item may be stored in the database 21. The display server 25 may retrieve this data using the information element 23 that is provided to the user at the end of the configuration process.

The information element 23 may be scanned by the image capture device 39 and the display server 25 may use the information encoded within the information element to contact the server 3 and request details of the transaction item that the user is interested in and the configuration settings/options for that item. Depending on the particular embodiment of the invention the information element may represent a unique identification code that is linked at the server 3 side to the user and their configured transaction item. Alternatively, the information element may encode user data, transaction item data and configuration options data.

Prior to displaying a render of the transaction item on the first display device 29 or second display devices 33 the user may be able to fine tune the configuration of the transaction item via a further display device 35 and further input device 37. The first display device 29 and further display device 35 may be of similar dimensions to one another and be located side by side such that updates to the configuration of the transaction item can be "moved" from the further display device 35 to the high definition render of the transaction item on the first display device 29. Where the further input device 37 is a touchscreen within the further display device 35 then the "movement" of the updated configured transaction item may comprise the user "swiping" the updated configured transaction item across from the further display 35 to the first display device 29.

The audio output 41 may be used to simulate a sound environment normally associated with the transaction item. For example, where the transaction item is a vehicle then the sounds may comprise simulated traffic noise or muffled traffic noise if the interior of the vehicle is being displayed.

Figure 4:
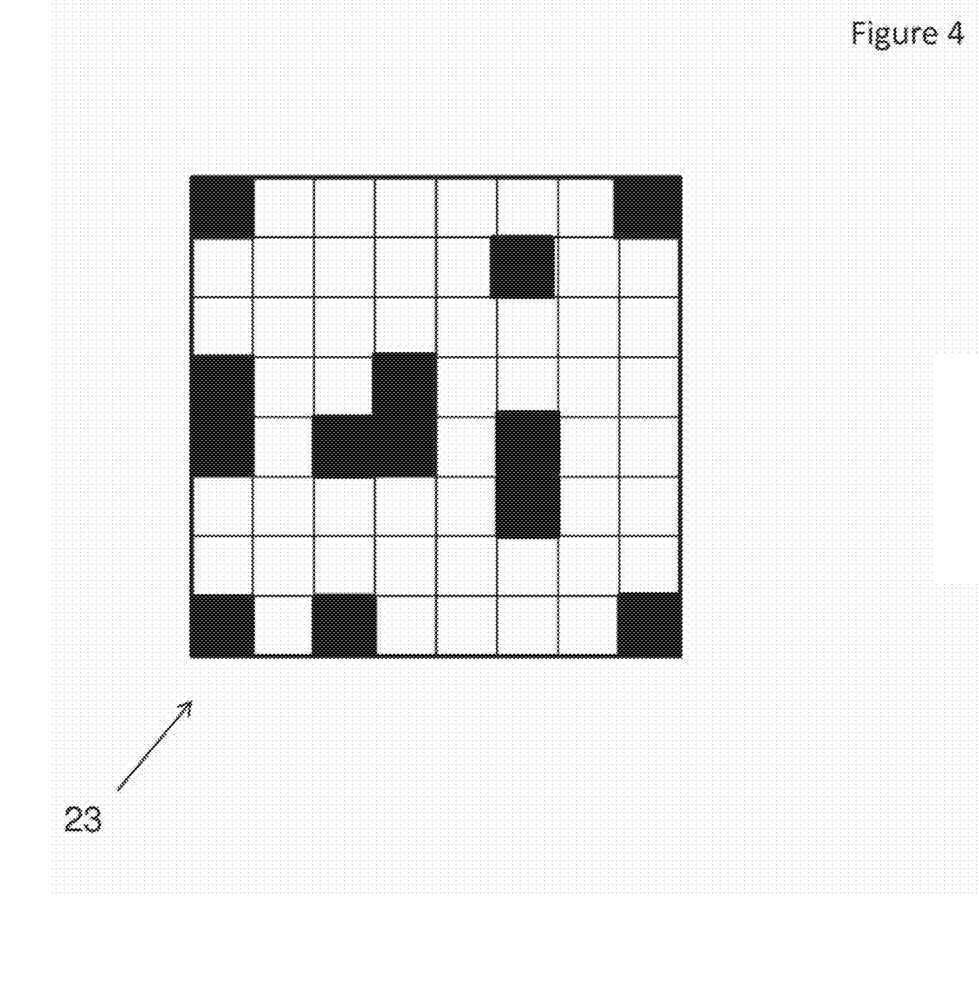
FIG. 4 shows examples of an information element according to an embodiment of the present invention being read by an element of the system component shown in FIG. 3.

In step 205 of FIG. 2 above the server 3 generates an information element 23 that is linked to the user's details and also to the configured transaction item that the user has configured via their user computing device 11. FIG. 4 shows a representation of one embodiment of an information element and further functionality of the information element is described in FIGS. 5 to 12.

The information element 23 shown in the embodiment depicted in FIG. 4 is an 8-by-8 grid in which individual grid cells may be in a first state (black cell) or a second state (white cell). By varying the state of the various cells in the information element a unique identifying information element may be created. As described above, this unique information element 23 may, via the CRM means 17, be used to link user data (e.g. name, address, contact details etc.) to a transaction item and the user's selected configuration options.

Alternative embodiments of the information element may comprise: larger or small grids (e.g. a 16-by-16 grid or a 6-by-6 grid); QR codes; barcodes; glyphs; content that is dynamically encoded (e.g. a repeating sequence of images) or any other mechanism that is suitable to encode content that may then be later retrieved by scanning the information element.

Figure 5:
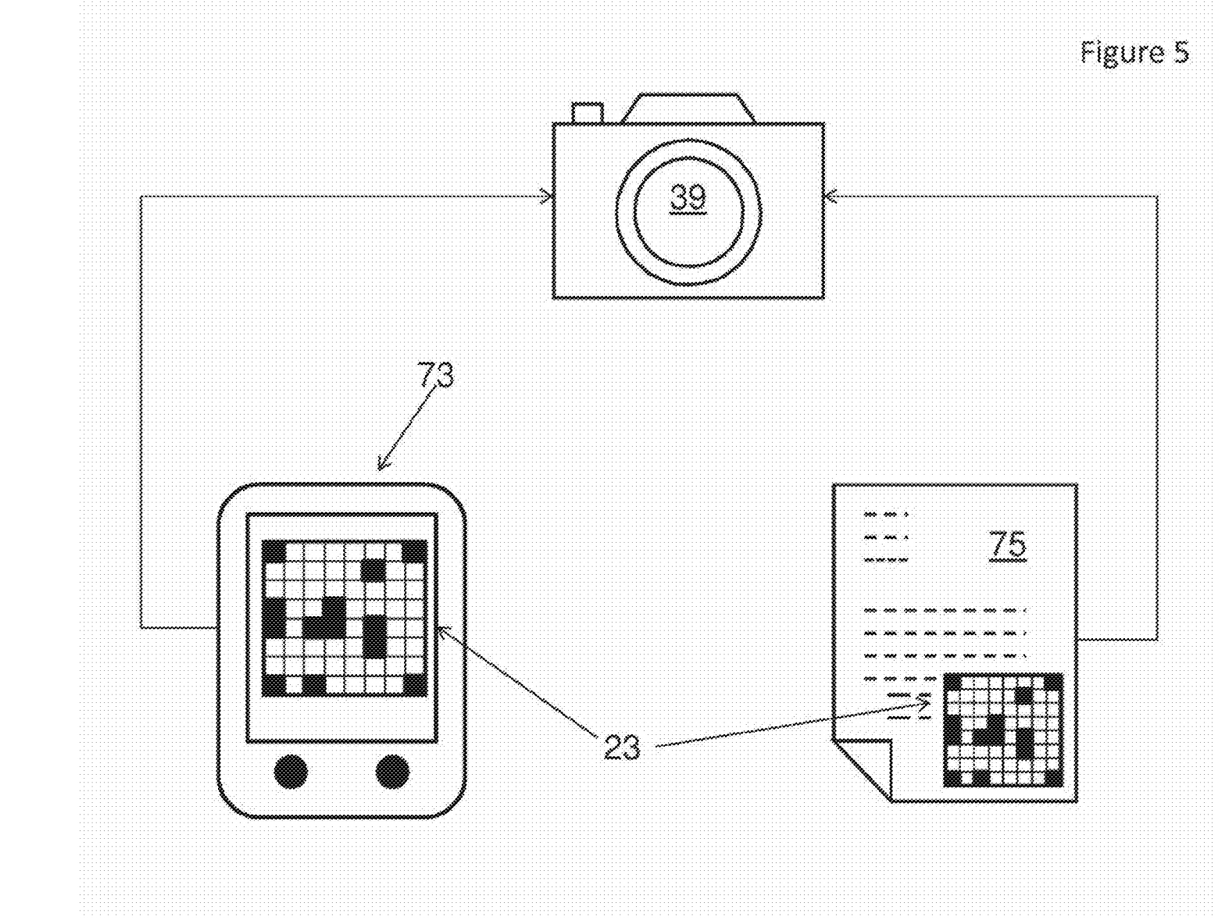
FIG. 5 shows information elements in accordance with a further embodiment of the present invention.

As shown in FIG. 5, the information element 23 that is generated by the server 3 may be sent to a user's mobile telecommunications device 73 or may be sent to the computing device 11 for printing as a paper document 75.

Once the user has received the information element 23 that is linked to their configured transaction item they may visit a location (such as a vehicle dealership) where the information element 23 is scanned (in step 207) by an image capture device 39 such that the user's details and data relating to their configured transaction item may be retrieved from the server 3. The information element may encode a user identifier or may also encode a unique reference locator (URL) address of the server 3.

In embodiments of the present invention the information element 23 may be constructed in such a way that obscuring parts of the information element 23 to the image capture device 39 may be used to trigger different functionality in a display system 5.

Figure 6:
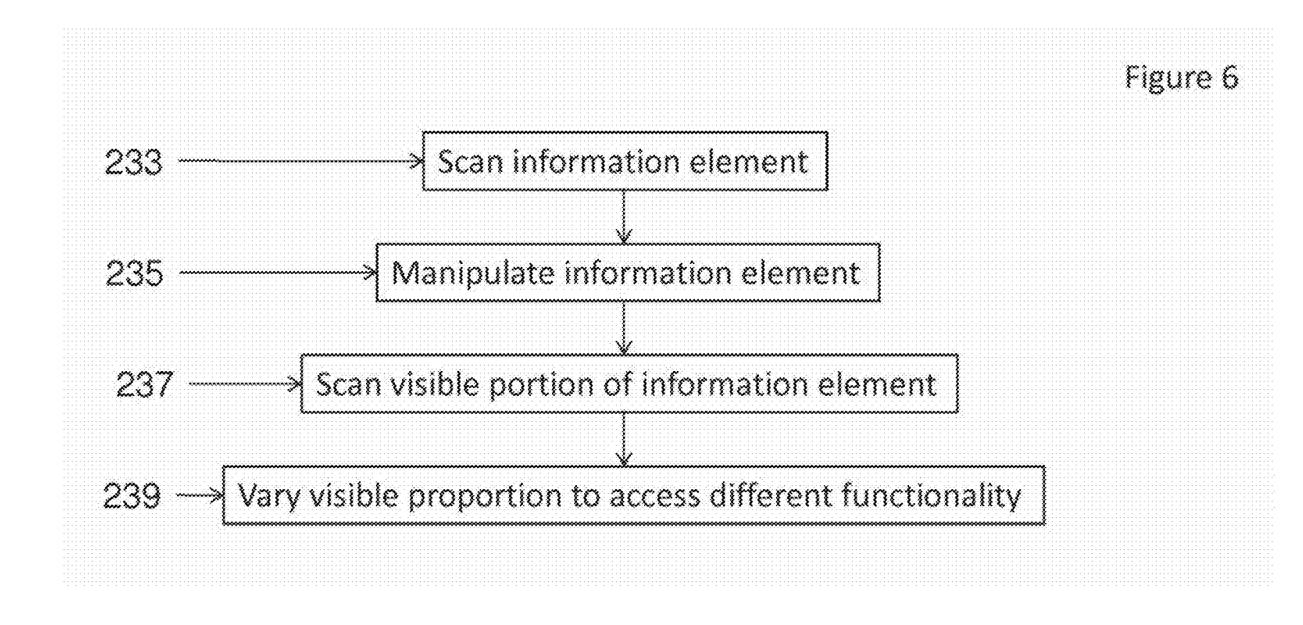
FIG. 6 is a flow chart showing the process of manipulating an information element in accordance with embodiments of the present invention.

FIG. 6 shows the process of using an information element 23 to trigger different functionality according to embodiments of the present invention.

In step 233 the information element 23 is presented to the image capture device 39 in order to be scanned to retrieve the data related to the information element. Scanning the information element 23 in this manner allows the server 25 of the display system 5 to retrieve user data and configuration options data relating to the transaction item stored in the database 21 linked to the server 3. Having retrieved the data related to the information element 23 the transaction item may be displayed, e.g. on the first display device 29 of the display system.

In step 235 the information element 23 (or a scannable aspect thereof) is manipulated such that re-scanning the information element (in step 237 below) results in the image capture device 39 capturing a different representation or version of the information element. The "scannable aspect" of the information element may encompass the entire information element and portions thereof. Manipulating the information element may comprise varying the scannable aspect that is visible to a scanner device (e.g. by obscuring or uncovering part of the information element relative to a previously scanned aspect or the element). Manipulating the element may also comprise rotating the information element relative to the scanner device.

Manipulating the scannable aspect of the information element 23 may comprise rotating the information element 23 relative to the rotation it was scanned in step 233. The server 25 may then detect the rotation of the element 23 when the element is scanned in step 237 below and trigger functionality based on the rotation type. To aid detection of rotation of the element 23 the information element 23 may be constructed such that it contains certain reference features that the image capture device 39 and server 25 can detect. For example, the corner elements may be coloured or shaded differently to one another.

Manipulating the scannable aspect of the information element 23 may also comprise obscuring a part of the information element 23 such that there is a visible portion and an obscured portion of the information element 23. Obscuring the information element 23 may be achieved simply by the user placing their hand over a portion of the information element 23 (either on the mobile telecommunications device 73 or on the printed document 75). Alternatively, a mask may be provided in order to obscure part of the information element 23. Where the information element 23 is displayed on a mobile device 73, the device 73 may be arranged to obscure part of the element 23 by changing the on-screen representation of the information element 23 (as discussed in relation to FIG. 8 below).

In step 237 the partially obscured information element 23 is scanned again such that the image capture device only captures the visible portion of the element 23. A processor (e.g. the server 25) in communication with the image capture device 39 may then interpret the captured image and trigger a pre-determined function in dependence on the particular part of the information element that is visible (e.g. change view of the object on the first display device 29, change the colour of the object on the first display device 29, open a menu on the first display device 29 or on the further display device 35 etc.).

Varying the part of the information element that is obscured, in step 239, may then be used to trigger different functionality. For example, obscuring different quadrants of the information element 23 shown in FIG. 4 may be linked to different functionality. The user may trigger this functionality by obscuring a certain part of the information element 23 and then re-scanning the element 23 with the image capture device 39.

The image capture device 39 may be in communication with a computing device (e.g. the server 25) shown in FIG. 3 which may be arranged to interpret the information element 23 and to interpret the information element 23 when only a part of the element is visible.

For example, upon scanning the full information element 23 in step 233 the computing device may retrieve or download data associated with the information element 23. The computing device may also at this time retrieve/download a series of partially obscured versions of the same information element each of which is linked with a particular function that the computing device could initiate in the event that the partially obscured information element is re-scanned. Since the computing device is downloading the relationship between the partially obscured versions of the information element and the functionality to be triggered on re-scanning the information element 23, this relationship may be altered between different users. For the vehicle transaction example, obscuring the top left corner of the element, for a first user, might mean a "change object colour" functionality is triggered to allow an object displayed on the first display device to change colour. However, for a different user, obscuring the top left corner of the element might mean a "show interior view" functionality is triggered to show the interior of the vehicle on the first display device.

In an alternative example, the computing device may be programmed such that obscuring a certain portion of an information element 23 results in the same functionality being triggered regardless of the actual information element being scanned.

Figure 7:
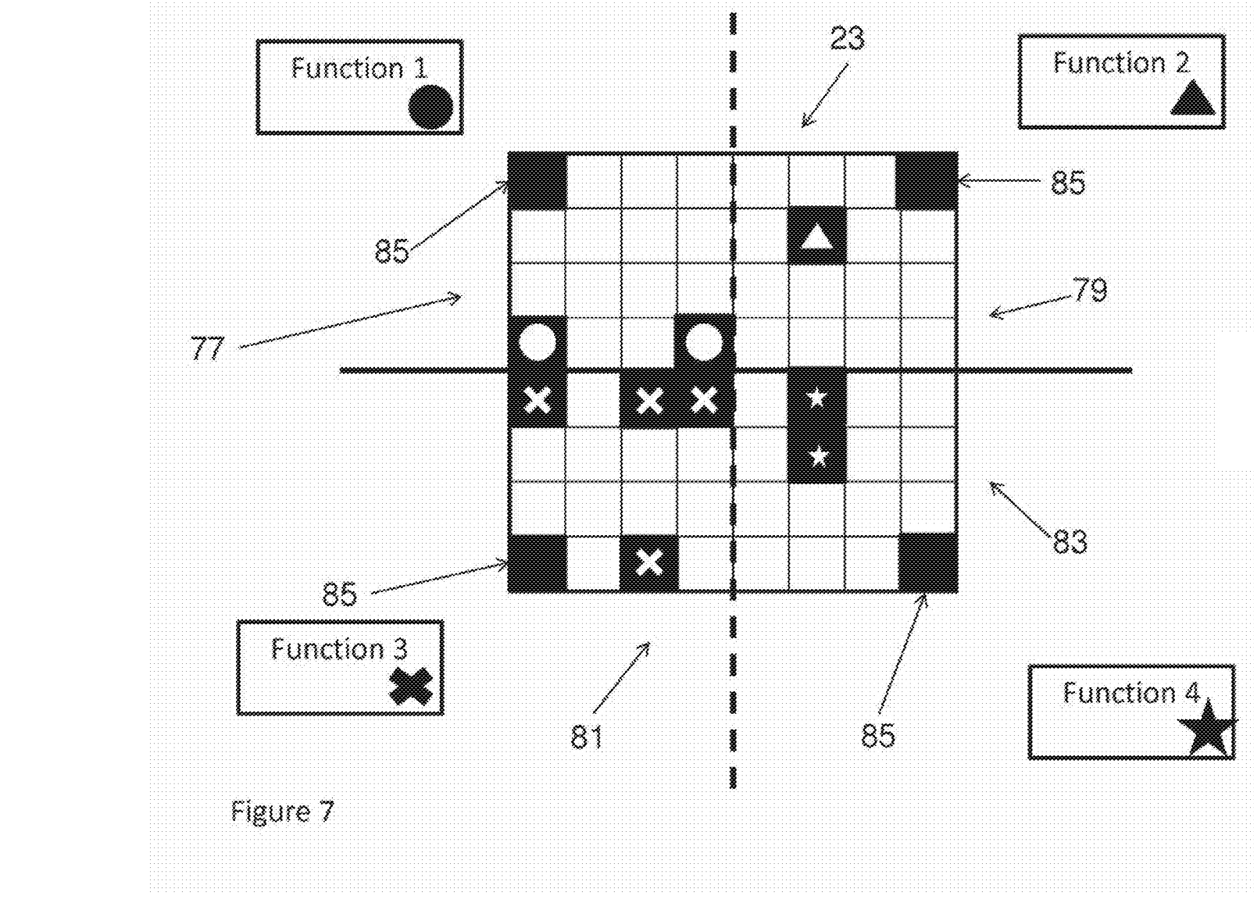
FIG. 7 shows an information element in accordance with a still further embodiment of the present invention.

FIG. 7 shows the Information element from FIG. 4 but further indicates the different functionality that may be triggered by re-scanning the information element 23 with the image capture device 39.

In FIG. 7 the information element is shown divided into four quadrants (77, 79, 81, 83) each of which is associated with a different function (Functions 1-4). The specific functionality is indicated next to each quadrant of the information element 23. In this manner a user is provided with instructions as to how to use the information element 23 to trigger different functionality.

Within the information element 23 shown in FIG. 7, the cells of each quadrant may be provided with a different shading or colour scheme to provide a further visual indicator to a user of the different functionality that the element may be able to trigger. This is shown in FIG. 7 via the circle, triangle, cross and star shading in the various quadrants. It is however noted that such shading/colour schemes would not be necessary for the information element 23 to be used to trigger different functionality. All that would be required would be to obscure parts of the element.

It is noted that, where a shading/colour scheme is used, the corner cells 85 of the information element 23 may all be left in a default colour/shading. This is to provide the image capture device 39 with an identifiable reference point in each quadrant so that the boundary of the information element 23 can be easily identified.

Figure 8:
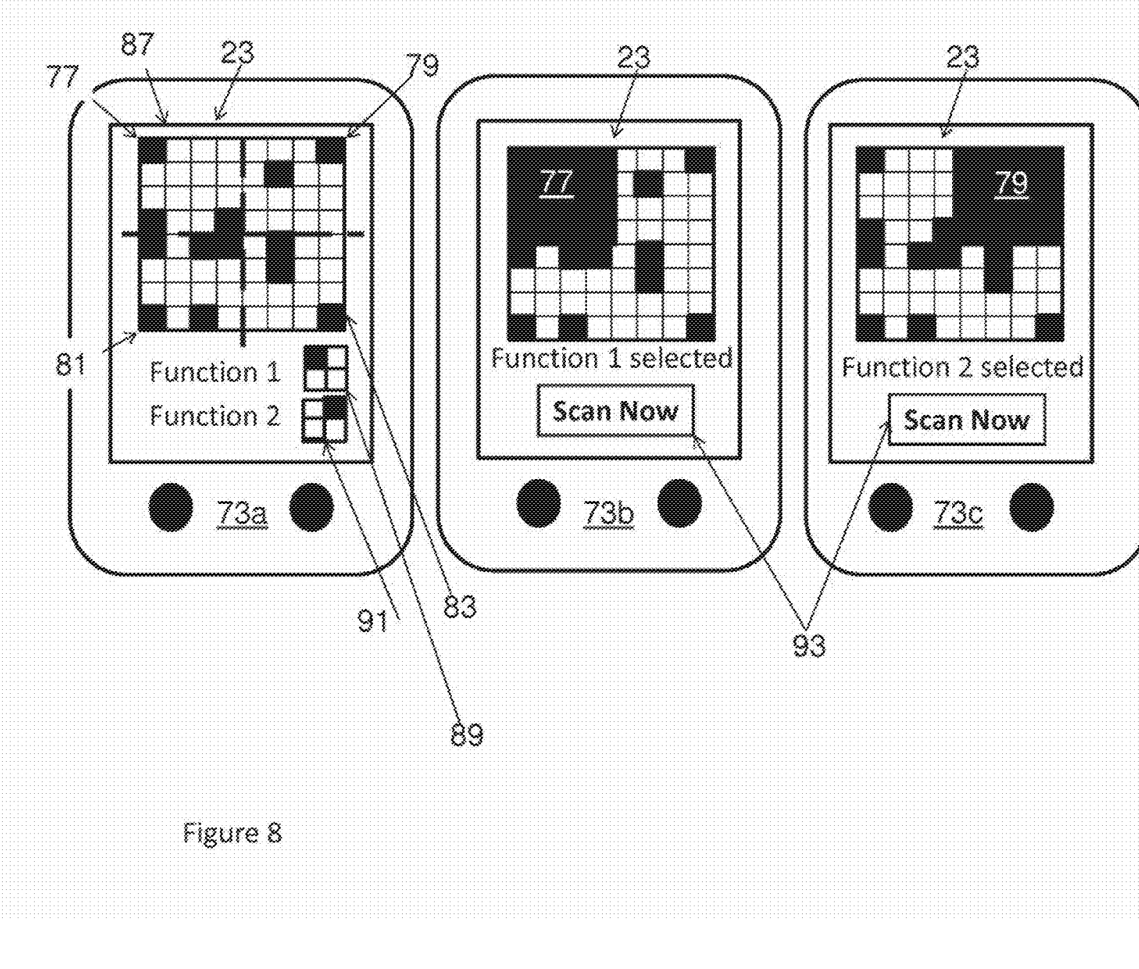
FIGS. 8 and 9 show an information element according to an embodiment of the present invention as displayed by a mobile computing device.

FIG. 8 shows three views of a mobile telecommunications device 73 which is displaying an information element 23 similar to that shown in FIG. 7.

In the left-hand image of the device 73 (device 73a), the information element 23 is located at the upper end of a display screen 87. The various functionality that the information element 23 may be used to trigger is indicated on the display screen 87, beneath the information element 23. As shown in the left hand image of FIG. 8, two functions are represented (Functions 1 and 2) on the display screen 87 under the information element 23. Next to each function is a representation (89, 91) of the information element 23 in which one of the quadrants of the element 23 has been obscured to indicate to the user of the device 73 how the information element 23 will be modified when a function is selected. It is noted that selecting one of the functions presented to the user on the display screen will change the on-screen representation of the information element 23 on the display screen 87. In the example of FIG. 8, if the user touches the representation 89 then the display device 73 will change the onscreen representation of the information element 23 as described below.

In the middle image (device 73b) Function 1 has been selected. It can be seen that the upper left quadrant 77 of the information element 23 shown in the left-hand image of the device 73 has now been obscured on the screen 87. Underneath the information element 23 a confirmation of the selected function is provided to the user plus an instruction 93 to re-scan the element 23 with the image capture device 39.

In the right-hand image (device 73c), Function 2 has been selected. It can be seen that the upper right quadrant 79 of the information element 23 shown in the left-hand image of the device 73 has now been obscured on screen 87. Underneath the information element 23 a confirmation of the selected function is provided to the user plus an instruction 93 to re-scan the element 23 with the image capture device 39.

Upon re-scanning (step 237) the middle or right-hand images the processor attached to the image capture device 39 would determine which part of the information element 23 had been obscured and then perform a specific function depending on a pre-determined relationship between the visible part of the information element and a set of functions.

Where the information element 23 is displayed on the display screen 87 of a computing device (e.g. the mobile device 73 of FIG. 13), the display of the information element 23 may be managed by a computer program (e.g. a smartphone "app") running on the device.

Figure 9:
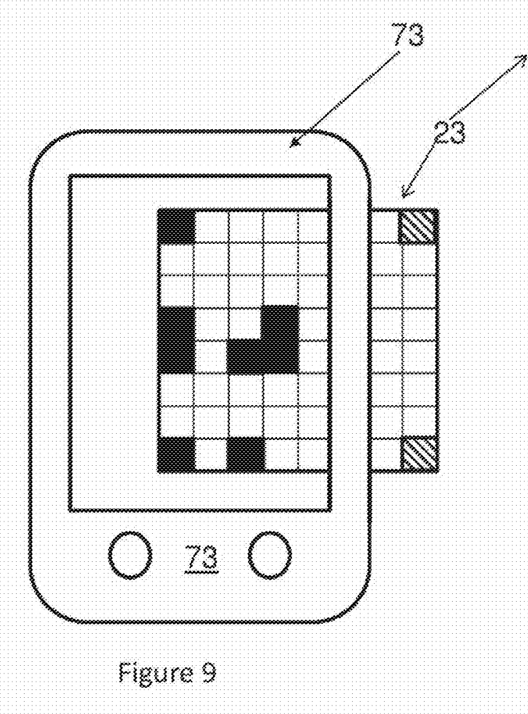
Figure 10:
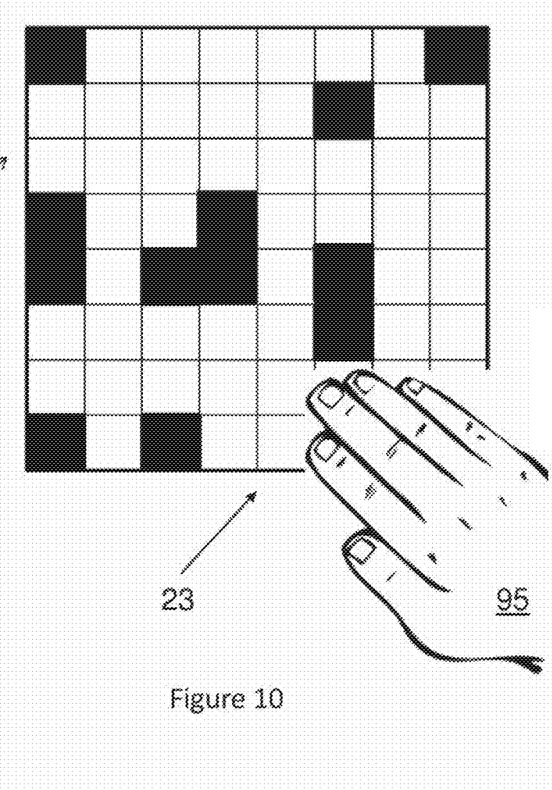
FIG. 10 shows an information element according to an embodiment of the present invention being partially obscured.

FIGS. 9 and 10 show two further mechanisms for interacting with an information element in accordance with further embodiments of the present invention.

In FIG. 9 the image capture device 39 (not shown in FIG. 9) is provided by a camera on the mobile telecommunications device 73. In use, the user may connect to the display system server 25 (e.g. via a Bluetooth® connection or via a WiFi® or other suitable wireless connection) so that the captured image of the scanned information element 23 can be sent to the server 25 for retrieval of the configured transaction item data. In Step 233 the mobile device 73 may be positioned over the information element 23 such that the entire element 23 is imaged by the camera. In Steps 235 and 237 the mobile device may be positioned, as shown in FIG. 9, such that only a part of the information element 23 is visible to the camera of the device. In this manner the visible part of the information element may be varied (Step 237) so that different functionality may be triggered.

In FIG. 10, the user's own hand 95 is used to obscure part of the information element 23.

Although the information element 23 is shown displayed on a user's mobile device 73 above it is to be appreciated that the information element may also be displayed on the second display device 33. The information element 23 may be displayed on the second display device in situations where the user does not have their own mobile computing device 73. The information element 23 may be retrieved by the user for display on the second display device 33 by accessing an email account to which they have had their information element 23 emailed. Alternatively, the second display device 33 may incorporate a user log-in screen to enable the user to log in to an account which contains their information element 23 and selected configuration options. Having accessed the information element 23 on the second display device 33 the user may proceed to manipulate the information element 23 as described above to trigger pre-defined functionality.

Further, although the image capture device 39 is described above as scanning the information element 23 it is to be appreciated that the image capture may take place via a camera device on the user's mobile device 73 (for example, in the event that the user has printed the information element 23 onto a paper document 75 then they may scan the element 23 with their own mobile device 73 which could be linked via a wireless communications signal such as Bluetooth® or WiFi® to the display system 5/display server 25). The image capture may also take place via a camera device on the second display device 33.

Figure 11:
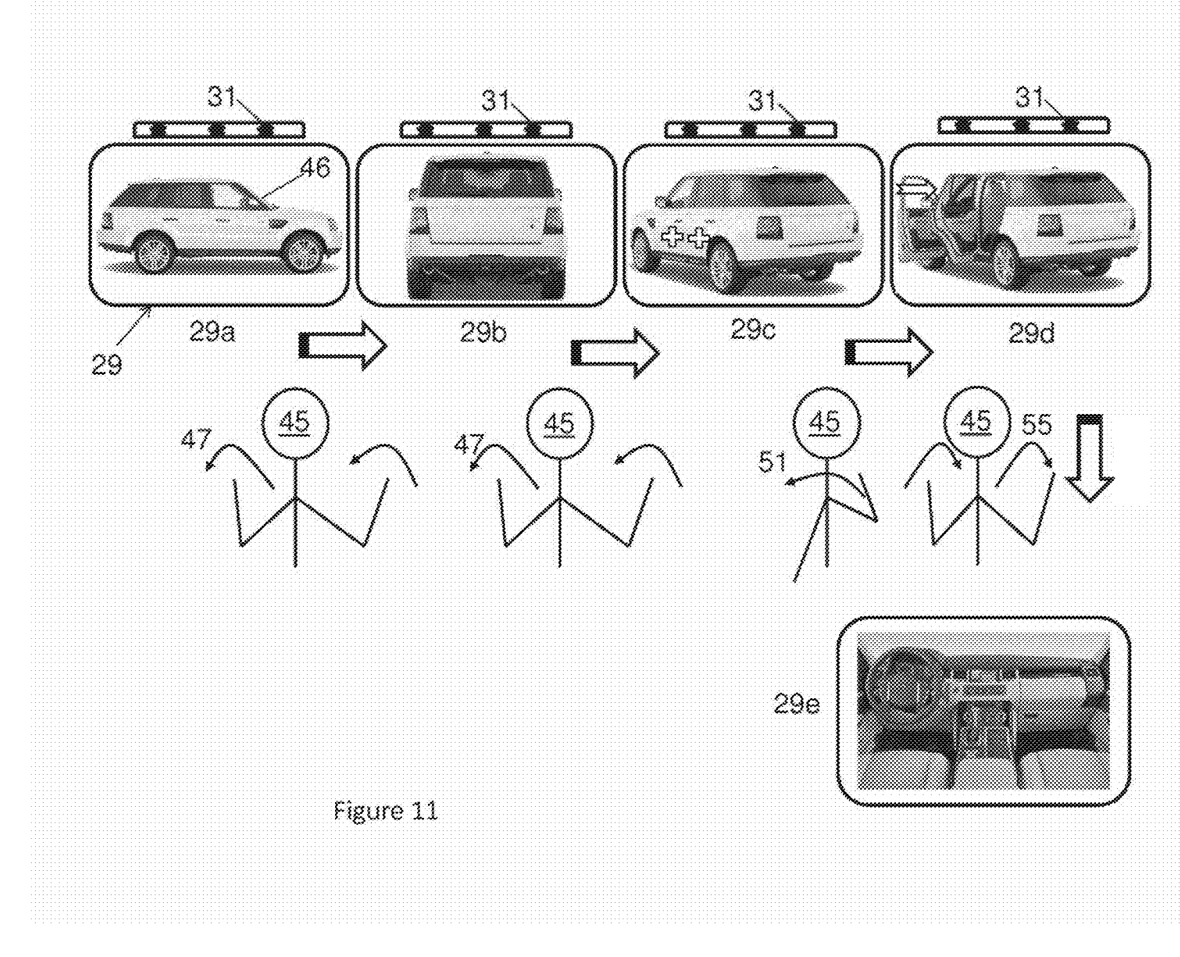
FIG. 11 shows a user interacting with components of the system shown in FIG. 3.

The functionality that is triggered by scanning the partially obscured information element 23 may include some or all of the following: changing the view of the object displayed on the first display device 29 (for example, as shown in FIG. 11, a user 45 could move through views 29a to 29e by re-scanning the partially obscured element 23): opening a menu list of commands (on either the second display device 33 or the user's own mobile device 73); changing a trim option (for example re-scanning the element 23 could change the selected wheel hub option displayed on the rendered simulation on the first display device 29); changing the colour of the simulated object 46 (for example re-scanning the element 23 could enable the user to sample a colour using the image capture device on their mobile device 73 and the simulated object 46 could be re-rendered in this colour). It is noted that as well as triggering functionality by scanning a partially obscured information element 23, the system shown in FIG. 11 is also configured to allow the user 45 to control the first display device 29 via a gesture control input device 31 (e.g. a Kinect® type device) and a series of gesture controls (47, 51, 55).

For ease of reference the various sections of the information element that can be obscured may be presented in a different visual manner to one another to aid the user. The different sections may be coloured differently or may be shaded differently. To provide a reference point to the image capture device some elements of the information element may be represented in the same manner across all sections of the information element. In FIG. 7 it is noted that the corner elements are all shaded in black whereas the remaining shaded cells all take one of four shading schemes.

Figure 12:
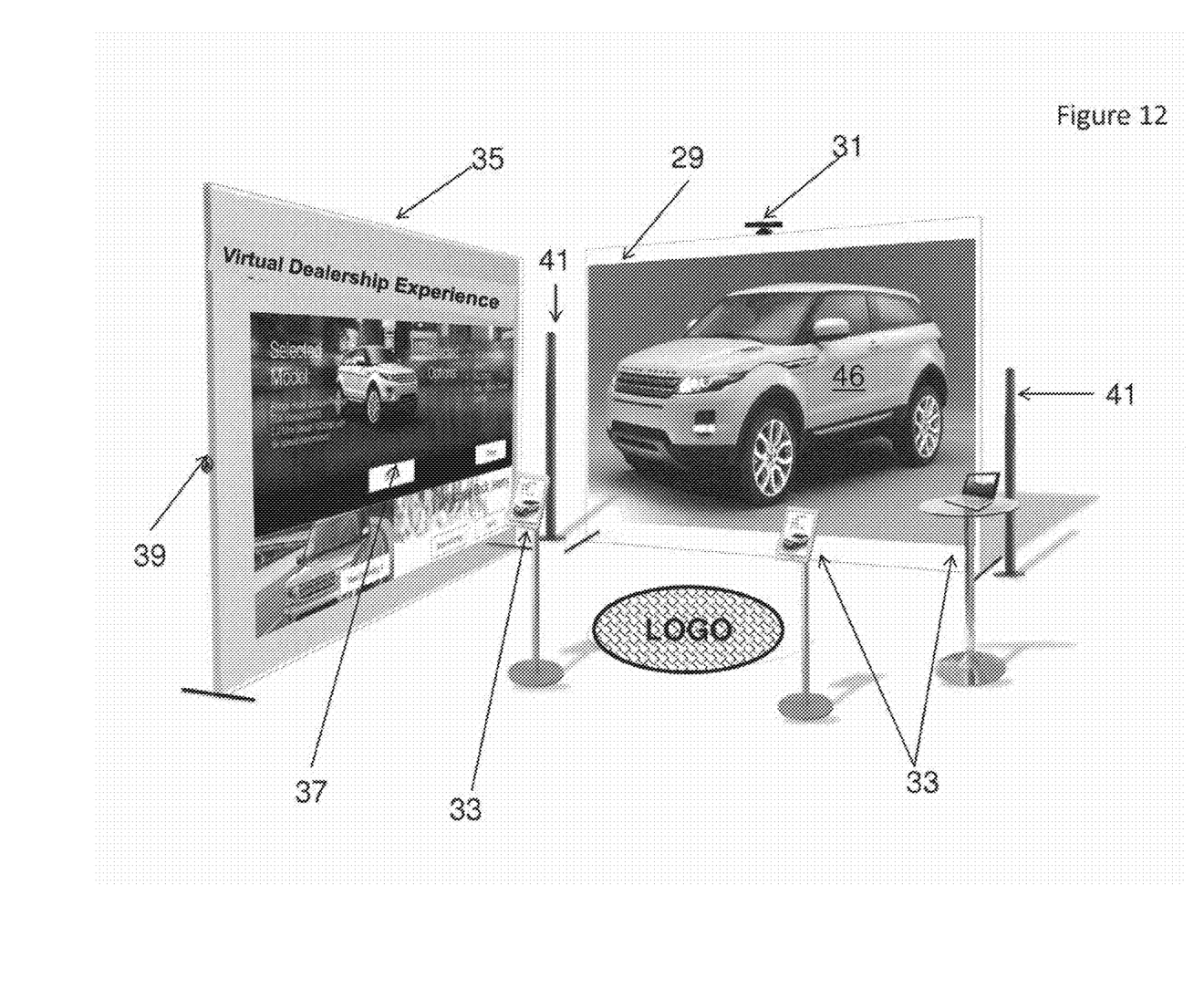
FIG. 12 shows a display system in accordance with an embodiment of the present invention.

FIG. 12 shows an embodiment of the present invention which depicts an arrangement of a first display device 29, a number of second display devices 33 and a further display device 35.

It can be seen that the first display device 29 is displaying a simulation of a vehicle 46 which a user may interact with via the Input device 31 located above the screen area of the first display device.

In this embodiment a further display device 35 is provided which displays the configuration options/settings selected by the user from their computing device 11 (not shown in in FIG. 11) in steps 201 and 203 described above. These settings are retrieved from the server 3 upon presentation of an information element 23 in accordance with further embodiments of the present invention at the image capture device 39. The further display device 35 essentially comprises a large scale configuration screen which is touch enabled (input device 37) to allow the user to make further fine adjustments to their configuration settings before rendering the transaction item (vehicle) on the first display device 29 or to make further fine adjustments upon reviewing the simulation on the first display device 29.

The description above is presented in the context of obscuring the information element 23 to trigger pre-determined functions. However, it is to be appreciated that embodiments of the present invention may additionally or alternatively use rotation of the information element 23 to trigger such functions. For example, Functions 1 and 2 shown in FIG. 8 may be linked with a rotation of the information element 23 and the representations 89 and 91 may indicate that, for example, the information element is to be rotated through 90 degrees clockwise or anti-clockwise. Re-scanning such a manipulated information element 23 with the image capture device 39 may then trigger further pre-defined functions.

The invention claimed is:

1. A method of using an information element to access functionality on a computing device, the method comprising:
scanning the information element to retrieve data related to the information element;
manipulating the information element; and
re-scanning the information element;
wherein manipulation of the information element triggers different functionality in the computing device when the information element is re-scanned, wherein manipulating the information element comprises obscuring a part of the information element such that there is a visible proportion and an obscured proportion of the information element, and wherein varying the part of the information element that is obscured triggers different functionality in the computing device when the information element is re-scanned.

2. A method as claimed in claim 1, wherein manipulating the information element comprises rotating the information element relative to a scanning device and wherein varying the orientation of the information element relative to the scanning device triggers different functionality in the computing device when the information element is re-scanned.

3. A method as claimed in claim 1, wherein the information element is scanned with an information capture device.

4. A method as claimed in claim 1, wherein the information element is in the form of optical content.

5. A method as claimed in claim 4, wherein the optical content is in the form of any one of: a barcode; a glyph; a dynamic optical encoding of content.

6. A method as claimed in claim 1, wherein scanning or re-scanning the information element comprises displaying the information element on a display device.

7. A method as claimed in claim 6, wherein the display device that the information element is displayed on is a mobile computing device.

8. A method as claimed in claim 6, wherein manipulation of the information element for re-scanning is controlled by the display device, a display screen representation of the information element being altered in order to manipulate the information element.

9. A method as claimed in claim 8, wherein the proportion of the information element visible for scanning is controlled by the display device, a display screen representation of the information element being altered in order to vary the part of the information element that is obscured.

10. A method as claimed in claim 1, wherein scanning the information element retrieves data comprising user identification data.

11. A method as claimed in claim 1, wherein scanning the information element retrieves function relationship data relating information element configurations to computing device functions.

12. A method as claimed in claim 11, wherein the function relationship data is user-specific.

13. A method as claimed in claim 1, wherein the functionality in the computing device triggered by re-scanning the information element comprises one or more of the following: changing the colour of a simulated object that is displayed on a display device in communication with the computing device; animating an object that is displayed on a display device in communication with the computing device; changing the view of an object that is displayed on a display device in communication with the computing device.

14. A method as claimed in claim 1, wherein scanning the information element retrieves data related to an object to be simulated.

15. A method as claimed in claim 14, wherein the object is a transaction item that has been configured by a user.

16. A method as claimed in claim 1, wherein scanning the information element starts a simulation of an object.

17. A method as claimed in claim 1, wherein the data related to the information element is retrieved from a further computing device.

18. A carrier medium for carrying a computer readable code for controlling a computing device to carry out the method of claim 1.

19. A system comprising:
a computing device
scanning means for scanning an information element
wherein the system is arranged to:
scan the information element using the scanning means to retrieve data related to the information element; and
re-scan the information element using the scanning means; and
compare the re-scanned information element to the scanned information element and to determine if the information element has been manipulated;
wherein the computing device is further arranged to perform different functionality depending on the type of manipulation of the information element, wherein manipulating the information element comprises obscuring a part of the information element such that there is a visible proportion and an obscured proportion of the information element, and wherein the computing device is further arranged to perform different functionality depending on the part of the information element that is obscured when the information element is re-scanned.

20. A computing device comprising:
inputs arranged to receive data from a scanning means; and
processing means arranged to interpret the data received by the inputs and to perform a different function in dependence on the received data;
wherein the computing device is arranged to:
receive data relating to a scan of the information element and to retrieve data related to the information element; and
receive data relating to a re-scan of the information element and compare the re-scanned information element to the scanned information element and to determine if the information element has been manipulated,
the processing means being arranged to perform different functionality depending on the type of manipulation of the information element that has occurred, wherein manipulating the information element comprises obscuring a part of the information element such that there is a visible proportion and an obscured proportion of the information element and wherein the computing device is further arranged to perform different functionality depending on the part of the information element that is obscured when the information element is re-scanned.

* * * * *